United States Patent
Krehl et al.

[11] Patent Number: 5,359,771
[45] Date of Patent: Nov. 1, 1994

[54] PROCESS FOR THE MANUFACTURE OF A GEAR WHEEL IN AN INTERNAL GREARED

[75] Inventors: Michael Krehl, Lauterstein-Nenningen; Rolf Schwarze; Gerhard Subek, both of Aalen-Wasseralfingen, all of Germany

[73] Assignee: Schwaebische Huettenwerke GmbH, Germany

[21] Appl. No.: 54,873

[22] Filed: Apr. 28, 1993

[30] Foreign Application Priority Data

May 21, 1992 [DE] Germany .................. 4216823

[51] Int. Cl.⁵ .................. B21D 53/28; F16H 55/12
[52] U.S. Cl. .................. 29/893; 29/407; 29/415; 29/463; 74/445
[58] Field of Search ............ 29/893, 463, 407, 412, 29/415; 74/439, 445; 219/113, 117.1

[56] References Cited

U.S. PATENT DOCUMENTS

| | | | |
|---|---|---|---|
| 2,884,835 | 5/1959 | Rupert | 29/463 |
| 3,429,700 | 2/1969 | Wiegand et al. | 29/463 |
| 3,511,962 | 5/1970 | Suter | 219/113 |
| 4,233,003 | 11/1980 | Jeng . | |
| 5,096,037 | 3/1992 | Knoess et al. | 29/463 |

FOREIGN PATENT DOCUMENTS

| | | | |
|---|---|---|---|
| 0422617 | 4/1991 | European Pat. Off. . | |
| 347260 | 1/1922 | Germany | 29/412 |
| 3933978 | 8/1991 | Germany . | |

*Primary Examiner*—P. W. Echols
*Attorney, Agent, or Firm*—Davis, Bujold & Streck

[57] ABSTRACT

In a process for the manufacture of a gear wheel in an internal geared wheel pump, which wheel consist of two half-wheels (2A, 2B), which are respectively equipped with overflow ducts (3) constructed as half cavities (4A, 4B), into which balls can be inserted, the half-wheels (3A, 3B) are joined so that the complete overflow ducts (3) are formed from the half-cavities (4A, 4B) and the teeth (5) of the gear wheel (1) lie over one another in alignment. The insertion of any valve balls into the half-cavities (4A or 4B) of a half-wheel (2A or 2B) is performed before a welding operation and the half-wheels (2A, 2B) undergo a capacitor discharge welding process.

9 Claims, 1 Drawing Sheet

PROCESS FOR THE MANUFACTURE OF A GEAR WHEEL IN AN INTERNAL GREARED

The invention relates to a process for the manufacture of a gear wheel for an internal geared wheel pump, which consists of two half-wheels, which are both equipped with overflow ducts constructed as half-cavities, into which balls can be inserted. The half-wheels are joined so that complete overflow ducts are formed from the half-cavities, and so that the teeth of the gear wheel lie one over the other in alignment.

A process of this type is described in German Patent Specification 39 33 978. This relates to a suction-controlled annular gear pump, in particular a hydraulic pump for motor vehicle engines. To form suitable pump characteristic curves, one of the gear wheels possesses internal overflow ducts, which house balls able to abut corresponding valve seats. Production of such gear wheels is complicated. Construction by explosion welding is unsuitable, as the parts become distorted.

For this reason, in the mentioned Patent, a further procedural variation for production was given, namely that two half-rings are used which are not connected to one another at all; they are fixed in their rotational position by the teeth of the corresponding gear wheel and can not be axially removed from one another because the end walls of the gear wheel chambers are supposed to prevent this. However, as the gear wheel has to be disposed so that it can rotate in its chamber, clearances between the gear and the end walls have to be left, which by necessity also allow a clearance to exist between the two half-wheels. Leakage produced as a result of these clearances is detrimental for the functioning of the internal geared wheel pump. Other manufacturing methods, also given, produce distortion and are expensive in production.

The object of the present invention is to provide a process for the production of the mentioned gear wheel in which the disadvantages mentioned do not occur. A further object of the invention is to provide a process which in just a few process steps permits the production of a gear wheel which has the most precise possible outer and inner contours with the lowest possible distortion phenomena.

This object is achieved in accordance with the invention by the following process steps:

a) The insertion of the valve balls into the half-cavities of a half-wheel before a welding operation and
b) the half-wheels undergo a capacitor discharge welding process.

According to this process both internal impellers and also internal geared wheels can be produced. It has been shown that the capacitor discharge welding method is particularly suitable for producing these gear wheels, as despite the large differences in cross section and thickness of the half-wheels only small distortion errors occur. The process can also be precisely reproduced in series production. The welding energy and the welding pressure for the welding volume to be processed can be determined by just a few experiments. Once set, the values can be used for all wheels having the same dimensions without further adjustment. Economical manufacture is possible because of the small number of operations.

In a very advantageous refinement of the invention it can be specified that at the same time as the formation of the teeth and of the overflow ducts constructed as half-cavities, welding knobs, which are connected to the half-wheels and project from the joint faces, are constructed on the end faces, of the half-wheels, which will be joint faces.

In the welding process according to the invention by the use of weld knobs there are created very high contact resistances, which have a very positive effect on the welding operation.

According to this method pitch differences which can occur during production, which can impair the operability of the pump, cannot always be completely avoided. In order to avoid this, according to a preferred embodiment of the invention the two half-wheels are produced as a single wheel piece in a first procedural step; the two front faces thereof are constructed to form the joint faces; after its production the wheel piece is divided, by a facing cut perpendicular to its axis of rotation, into two half-wheels; the half-wheels then are turned by 180° around an axis lying perpendicular to the axis of rotation prior to welding.

This has the advantage that both gear wheel halves are produced in a single wheel piece, so that a possible pitch error cannot result from the fact that in its two wheel halves the welded wheel has teeth which are offset with respect to one another.

Simultaneously with the formation of the teeth, at points on one joint face, which lie opposite the welding knobs on the other joint face, are provided welding depressions. The welding depressions can have such a volume that they collect the material which "flows away" from the welding knobs during the welding operation so that a flush and plane connection is produced when welding the two wheel-halves together.

The two half-wheels are expediently positioned in alignment during their transport to the welding machine and/or during welding.

When the two half-wheels are first produced as a single wheel piece, which is subsequently divided, in order to facilitate the location of the gear teeth of the two wheel halves when fitted together, the single wheel piece is marked by a surface line applied to its periphery. This can be a V-groove, which is removed, after the two wheel halves have been welded together, simultaneously with machining of the cylindrical surfaces of the gear wheel, as is, in any case, required.

According to another embodiment of the invention the insertion of the valve balls is performed by a vacuum applied to each of the valve balls which are then positioned so that after the removal of the vacuum the balls fall into the half-cavities beneath them.

The two half-wheels are advantageously positioned in alignment by electrically non-conductive positioning members, as a result of which undesirable electrical conduction is avoided during the capacitor discharge welding process.

To test the welded gear wheel, in accordance with a preferred embodiment of the invention it is subjected to a vibration operation; the resultant frequency spectrum is electronically recorded, for example, and compared with a frequency spectrum corresponding to the gear wheel which is error-free with respect to the number and mobility of the valve balls.

In the event of an unacceptable variation in the two frequency spectra, a control can be triggered which eliminates the gear wheel subject to a vibration operation as a reject.

A further advantageous test procedure consists of providing a fluid, i.e. a liquid or a gas, flow to the inlet or outlet apertures of the welded gear wheel and measuring the pressure difference between the inlet and outlet apertures. This pressure difference is compared with the pressure difference corresponding to a gear wheel which is fault-free with respect to the number and mobility of the valve balls.

In the event of an unacceptable pressure difference, a control can be triggered which eliminates the gear wheel subject to the unacceptable pressure difference measurement as a reject.

The invention is described in further detail in the following exemplified embodiment, with reference to the accompanying drawings, in which.

Figure 1:
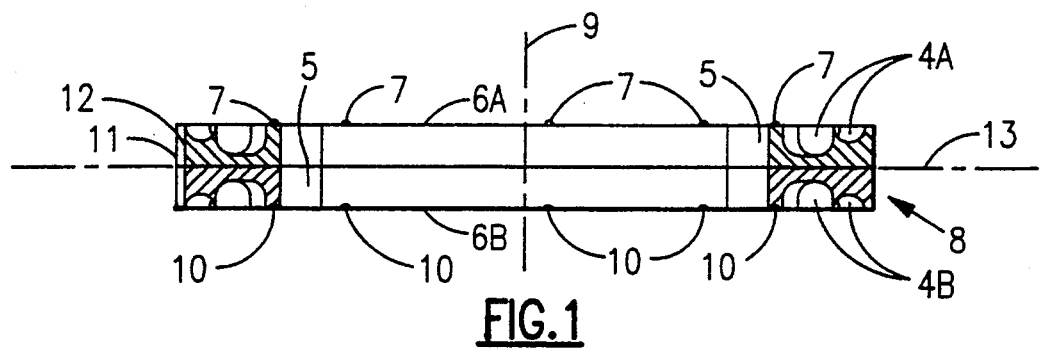
FIG. 1 shows the single wheel piece.

The single wheel piece 8 in FIG. 1, which is produced in a known way in a compacting and sintering operation from powdered metal, comprises teeth 5 and half-cavities 4A and 4B, which in the finished gear wheel 1 form overflow ducts 3.

With the single wheel piece 8 in FIG. 1, joint faces 6A and 6B are shown on the outside, i.e. represent the end faces in this procedural step. Joint face 6A comprises a plurality of welding knobs 7 distributed evenly over the end face. Welding depressions 10 are provided on the opposite joint face 6B so that they are exactly opposite the welding knobs 7.

The single wheel piece 8 produced in this way is now divided in a plane 13 which lies perpendicular to the axis of rotation 9. As a result the two half-wheels 2A and 2B shown in FIG. 2 are produced.

Figure 2:
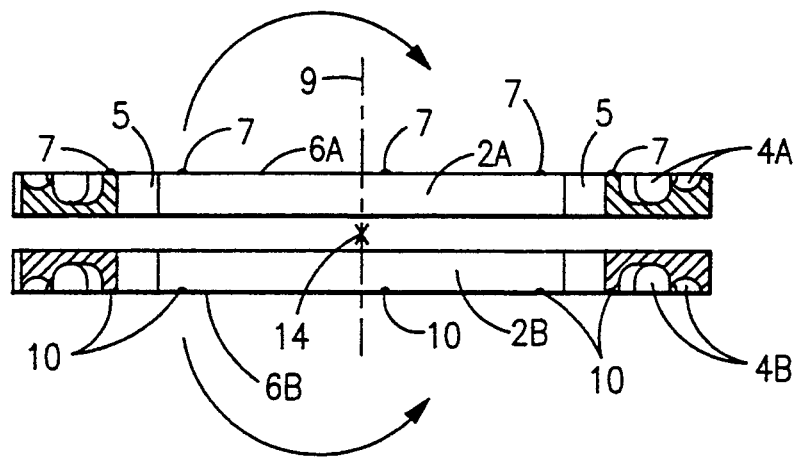
FIG. 2 shows wheel piece of FIG. 1 divided into two wheels halves.
Figure 3:
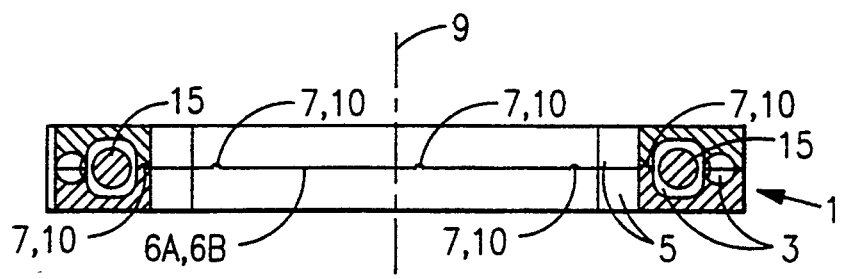
FIG. 3 shows the finished gear wheel, as is shown in FIGS. 1 and 2 of German Patent Specification 39 33 978, for example.

They are now turned about an axis 14 that is perpendicular to the axis of rotation 9 as shown by the arrow directions in FIG. 2 so that they lie one on top of the other, as shown in FIG. 3.

In order to eliminate a pitch error of the teeth 5, which is possible during the production of the single wheel 8 shown in FIG. 1, when joining the two half-wheels 2A and 2B as shown in FIG. 3, during the production of the single wheel piece 8 on its periphery 11 is provided a V-shaped groove 12, which extends exactly parallel to a surface line on the periphery parallel to the axis of rotation 9. This groove is also maintained during the separation into two half-wheels shown in FIG. 2 and when the two wheels are placed one on top of the other as shown in FIG. 3 it is used for the correct positioning of the individual teeth 5 of the half-wheels 2A and 2B.

After positioning the two half-wheels 2A and 2B, for example, by two or more pins or rollers made from non-conductive material, e.g. ceramics, with the pins or rollers positioned so that they are distributed on the periphery or between the teeth, welding is performed in a capacitor discharge welding machine. The welding operation in a capacitor discharge welding machine is known per se, for which reason only a short description is given here.

As is known, capacitor discharge welding is a special type of resistance welding process, in which the energy required during welding is not directly taken from a mains supply via a transformer, but is taken from a capacitor battery, which is charged as an energy store in an ancillary time.

The electrodes are conveyed towards the workpieces to be joined—in the present case the half-wheels—and when the required welding pressure is reached the welding pulse is triggered. As this welding pulse is extremely short, the energy is concentrated on the actual welding zone. As a result after welding the workpieces come out of the machine practically cold and remain dimensionally stable. They display no distortion or dimensional changes in particular.

Energy and pressure are the control parameters for the welding, which is adapted according to the welded part. In this case the capacitor battery is charged with constant current to the set energy. A pneumatically or hydraulically operated welding press conveys the electrodes to the knobs on the workpiece, in the present case to the gear wheel, and builds up the set welding pressure. The capacitors are discharged therewith and the welding current flows over the gear wheel.

Instead of producing the gear wheel—as described above—from a single member, which is subsequently divided into the two half-wheels 2A and 2B, it is also possible to produce the gear wheel from two mirror-inverted half-wheel halves, in which half-cavities are formed on one end face. The two mirror-inverted half-wheels can be produced—in the same way as in the first example—in a normal powder metallurgy production process, i.e. compacting, sintering and sizing. Then the two half-wheels are connected to one another in the same way as described above in a capacitor discharge welding machine to form a single-piece gear wheel.

In both exemplified embodiments the valve balls 15 are previously inserted into the half-cavities of one of the two half-wheels.

Of course the arrangement of the balls in the overflow ducts is not absolutely necessary to achieve the object set. In individual cases the overflow ducts may also be kept free from any valve parts.

We claim:

1. A process for producing a gear wheel, for an internal gear wheel pump, comprising two mating half-wheels; each half-wheel having a joint surface, with half-cavities being formed in the joint surface thereof, and internal gear teeth being formed on an inner periphery of the gear wheel; the half-cavities, when the joint surfaces of the two half-wheels are joined together, forming overflow ducts, and valve balls being inserted into the overflow ducts prior to assembly of the gear wheel;

said process comprising the steps of:

forming, from a unitary wheel, the internal gear teeth on an inner periphery of the unitary wheel and forming the half-cavities in two opposed external joint surfaces of the unitary wheel, and the internal gear teeth defining an axis of rotation of the unitary wheel;

dividing the unitary wheel in half along a plane that extends perpendicular to the axis of rotation thereby forming the two half-wheels;

flipping both of the two half-wheels 180° about an axis lying perpendicular to the axis of rotation;

inserting valve balls into the half-cavities of one of the half-wheels;

engaging the two joint surfaces of the two half-wheels together with one another and aligning the internal gear teeth and the half cavities; and welding the two half-wheels together.

2. A process according to claim 1, further comprising the step of:

providing welding knobs on one of the external joint surfaces of the unitary wheel and corresponding welding depressions in the other external joint surface of the unitary wheel upon forming the half-cavities, the welding knobs and welding depressions being provided so that a corresponding welding knob is received within a corresponding welding depression when the two half-wheels are joined joint surface to joint surface.

3. A process according to claim 1, prior to forming the teeth and half-cavities further comprising the steps of:

compacting metal powder into a desired shape and sintering the metal powder to produce the unitary wheel.

4. A process according to claim 1, further comprising the step of:

providing an axially extending marking on a surface of the unitary wheel, prior to dividing the unitary wheel, for use in aligning the two half-wheels.

5. A process according to claim 4, further comprising the step of:

providing an axially extending V-shaped groove in an outer periphery of the unitary wheel, prior to dividing the unitary wheel, for use in aligning the two half-wheels.

6. A process according to claim 1, further comprising the step of, after assembly of the gear wheel, testing the gear wheel by:

vibrating the gear wheel;

measuring the frequency spectrum of the gear wheel;

comparing the frequency spectrum of the gear wheel to a frequency spectrum produced by a gear wheel that is substantially error free;

rejecting the assembled gear wheel if the variation between the measured frequency spectrum and the error free frequency spectrum exceeds an acceptable level.

7. A process according to claim 1, further comprising the step of, after assembly of the gear wheel, testing the gear wheel by:

providing fluid to one of an inlet and an outlet of the gear wheel;

measuring a resulting pressure difference between the inlet and the outlet of the gear wheel;

comparing the resulting pressure difference of the gear wheel with a pressure difference produced in a substantially error free gear wheel; and rejecting the assembled gear wheel if the variation between the measured pressure difference and the error free pressure difference exceeds and acceptable level.

8. A process according to claim 1, further comprising the step of using a capacitor discharge welding process to weld the two half-wheels together.

9. A process according to claim 1, further comprising the step of aligning the two half-wheels with one another prior to transporting the aligned two half-wheels to a welding site.

* * * * *